Figure 1:
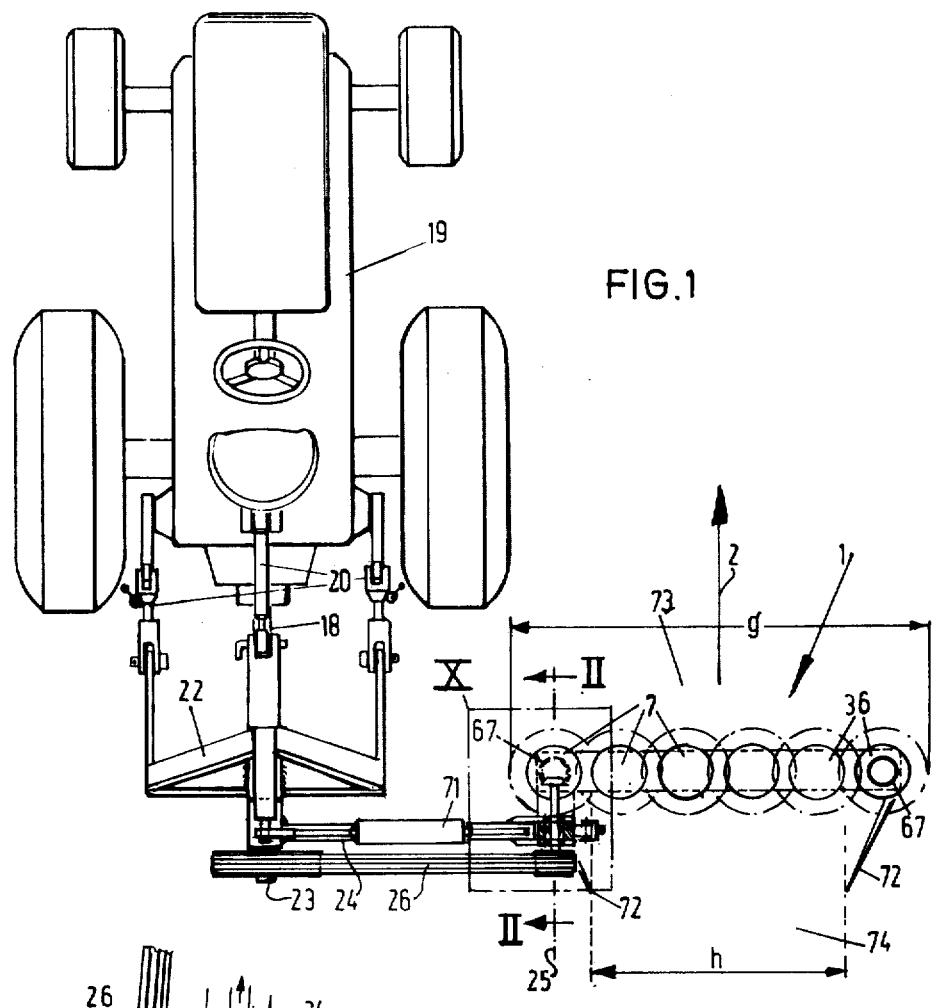

United States Patent [19]
Oosterling et al.

[11] 3,972,159
[45] Aug. 3, 1976

[54] MOWING IMPLEMENT

[75] Inventors: Pieter Adriaan Oosterling; Hendricus Cornelis van Staveren, both of Nieuw-Vennep, Netherlands

[73] Assignee: Multinorm B.V., Nieuw-Vennep, Netherlands

[22] Filed: Dec. 27, 1974

[21] Appl. No.: 536,741

[30] Foreign Application Priority Data
Dec. 28, 1973 Netherlands............ 7317824

[52] U.S. Cl................................. 56/192; 56/16.2; 56/295
[51] Int. Cl.²........................................ A01D 57/30
[58] Field of Search ........... 56/6, 295, 192, 11.9, 56/13.6, 12.3, 16.2

[56] References Cited
UNITED STATES PATENTS

| | | | |
|---|---|---|---|
| 3,469,378 | 9/1969 | Heesters et al. | 56/11.9 |
| 3,524,306 | 8/1970 | Reber | 56/12.3 |
| 3,708,966 | 1/1973 | Reber | 56/6 |

Primary Examiner—Russell R. Kinsey
Attorney, Agent, or Firm—Snyder, Brown and Ramik

[57] ABSTRACT

A mowing implement comprises a housing extending transversely of the direction of travel of the implement, said housing being connected via a foot which is directed rearwardly from the housing with suspension means for fastening the housing to a vehicle. As a result the mowing implement may be fastened firmly to the vehicle.

17 Claims, 11 Drawing Figures

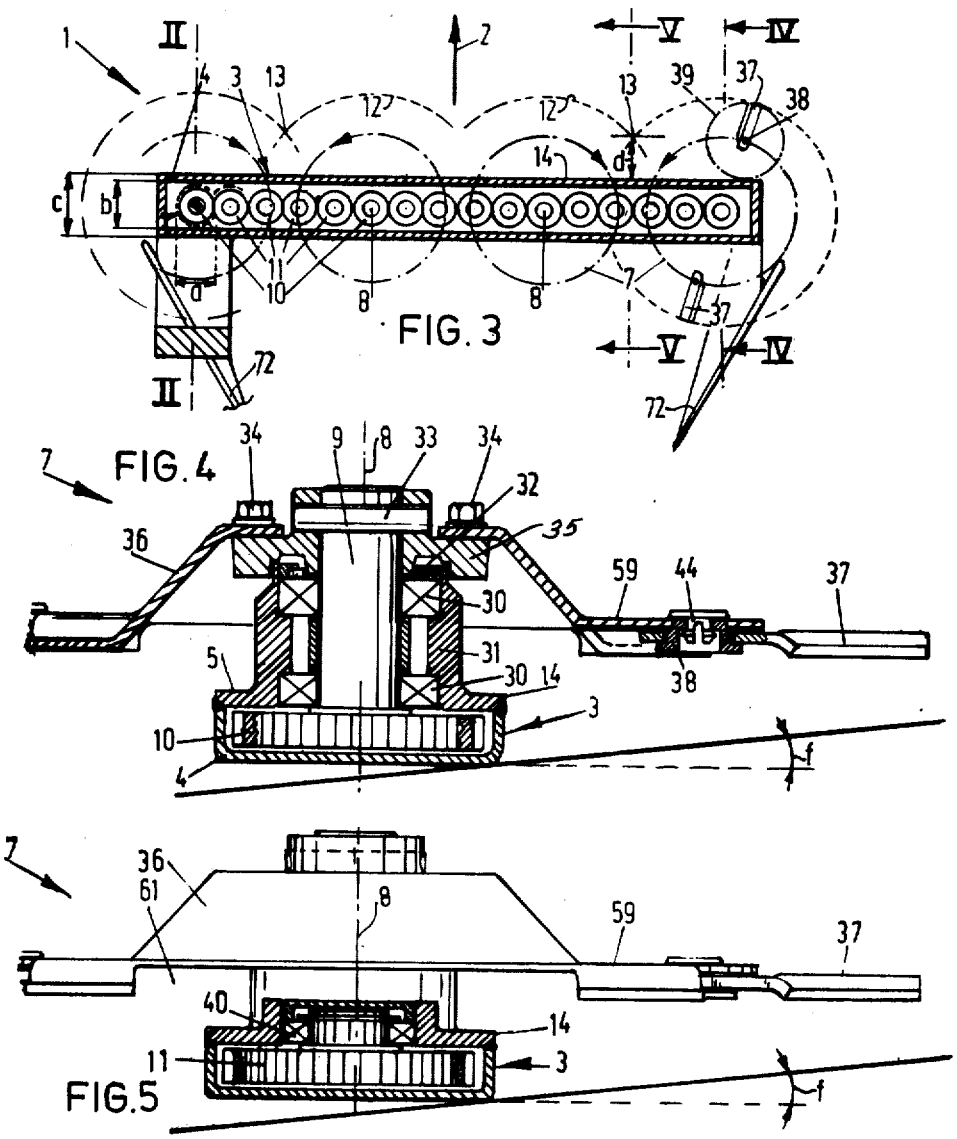

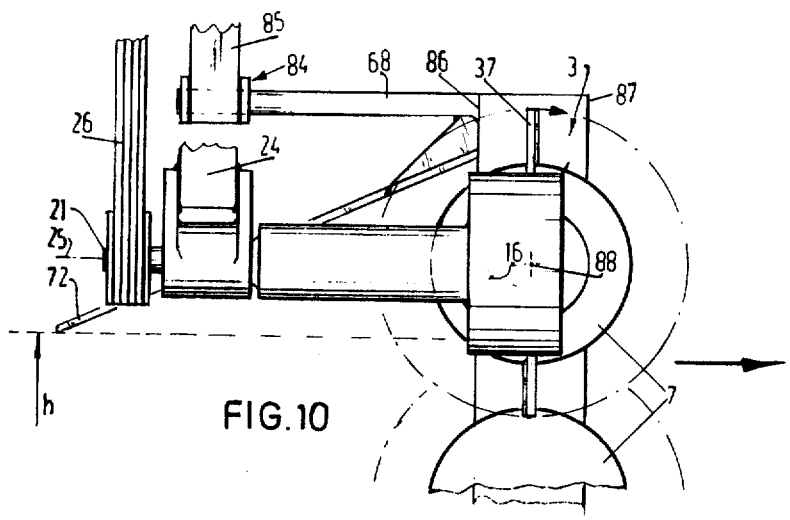
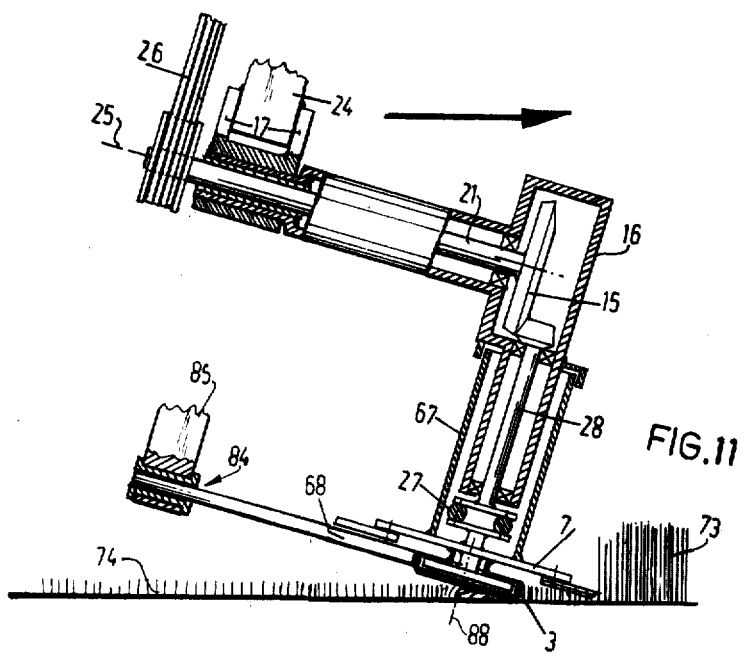

MOWING IMPLEMENT

The invention relates to a mowing implement comprising a housing extending transversely of the direction of travel of the implement, suspension means for fastening the housing to a vehicle, a plurality of cutting members arranged above the housing and rotatably journalled on said housing and a driving gear of a sequence of gear wheels, arranged in said housing, driven through coupling means by a driving member energized by the vehicle and driving the cutting members, each of which comprises a cutter holder and at least one cutter fastened to the periphery of the cutter holder, at least one of the cutting members supporting a drum above the disc.

A mowing implement of the kind set forth is known.

With this known mowing implement the driving gear accommodated in housing is driven through coupling means comprising a bevel gear wheel drive mounted at one of the two ends of the housing. When a first strip of crop of a field is cut, the end of the housing holding the bevel gear wheel drive and projecting out of the mowing width comes into contact with crop not yet cut. Therefore, mowing of the first strip is difficult.

Apart from the mowing device set forth above a different type of mowing device is known in which the housing with the driving gear accommodated therein for driving the cutting members is arranged high above the cutting members. Each cutting member is then driven by a vertical shaft extending across a drum arranged above each cutting member and rotating therewith. In this mowing device the cut crop is clamped between two drums of adjacent cutting members rotating towards one another in opposite senses and ejected to the rear. When the crop is clamped, the drums and the associated cutting members are urged away from one another. With this prior art mowing devices it is difficult to hold the cutting members firmly at their places.

The invention has for its object to provide a mowing device which can be constructed in a rugged form and can be firmly attached to the vehicle and by means of which a first strip of a field can be readily cut. The invention provides, therefore, an improvement of the mowing device of the kind set forth in that the coupling means extend through at least one drum and in that at least one of the two ends of the housing is firmly connected with a support forming part of the suspension means and exending within the mowing width of the mowing device from the housing to the rear. In this mowing device no driving housing is projecting beyond the mowing zone at the level of the crop. If only each of the two outermost cutting members holds a drum, whereas the upper surface of each of the cutting members lying therebetween is mainly constituted by a cutting holder, the cut crop is separated on both sides of the mowing zone by means of a drum from uncut crop so that this mowing device is particularly suitable for cutting a strip of crop from an integral field. Between the drums held by the outermost cutting members the crop gets behind the mowing device, since the mowing device moves past beneath the crop. The crop is lifted only slightly and remains practically stationary. Therefore, this mowing device requires little energy as compared with the known mowing device, in which the crop is pinched between the drums of all cutting members and is thrown out to the rear.

The aforesaid and further features of the invention will become apparent from the following description of preferred embodiments of a mowing device in accordance with the invention.

Figure 2:
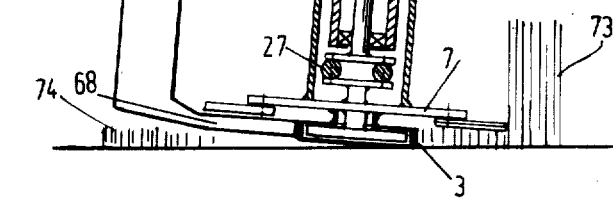
Figure 6:
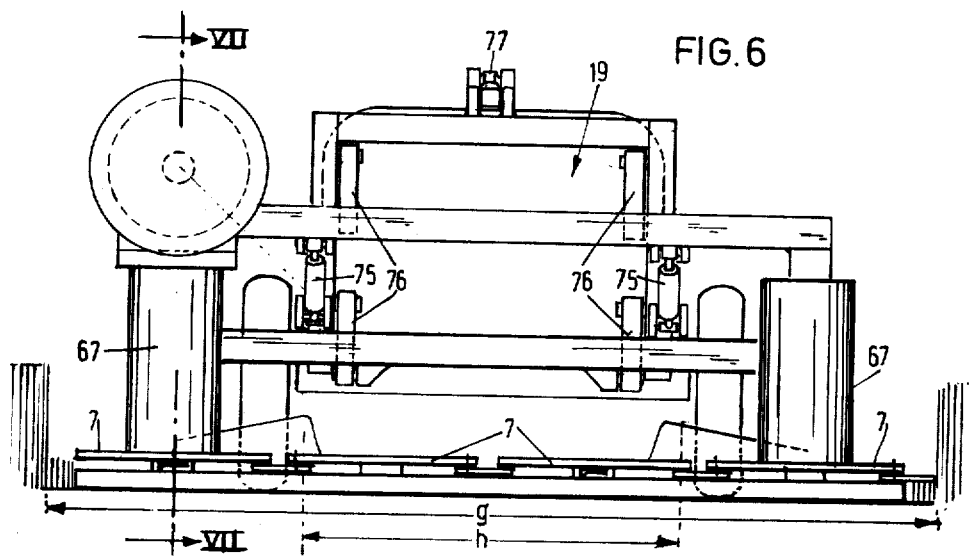
Figure 7:
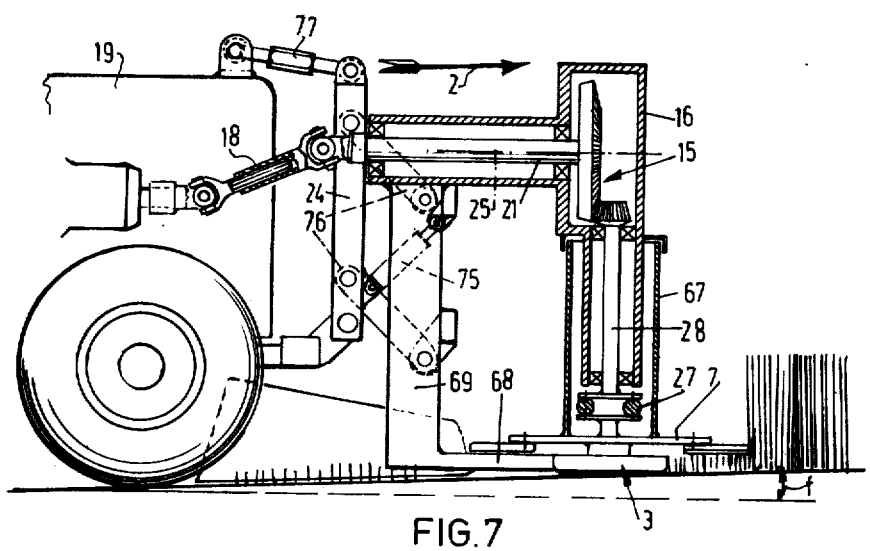
Figure 8:
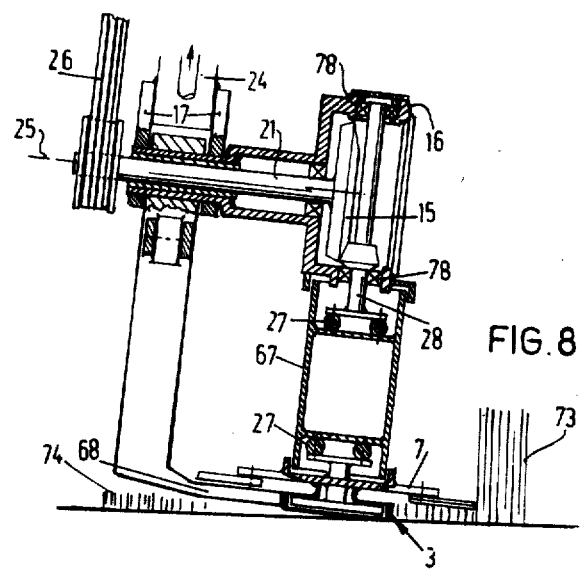
Figure 9:
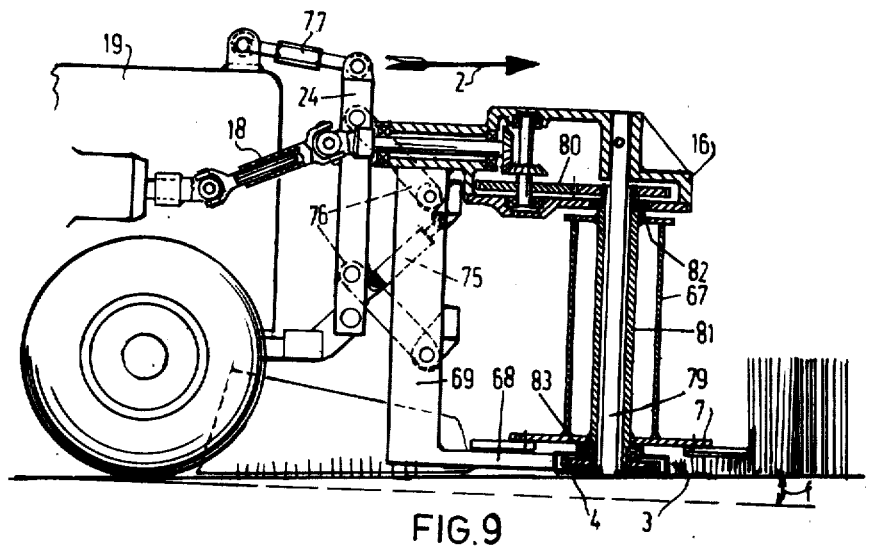

In the drawing:

FIG. 1 is a plan view of a tractor and a mowing device in accordance with the invention, FIG. 2 is an enlarged sectional view taken on the line II—II in FIG. 1, FIG. 3 is a horizontal sectional view of the housing of the driving gear in the mowing device shown in FIG. 1, FIG. 4 is a sectional view taken on the line IV—IV in FIG. 3, FIG. 5 is a sectional view taken on the line V—V in FIG. 3, FIG. 6 is a front elevation of a further embodiment of the device in accordance with the invention, FIG. 7 is a sectional view taken on the line VII—VII in FIG. 6, FIG. 8 is a secitonal view like FIG. 2 of a further embodiment, FIG. 9 is a sectional view like FIG. 7 of a further embodiment, FIG. 10 shows a detail like detail X in FIG. 1 of a further embodiment, and FIG. 11 is an enlarged sectional view taken on the line XI—XI in FIG. 10.

The mowing device 1 shown in FIG. 1 is attached to a frame 22 suspended from the suspension bars or links 20 of a tractor 19, in which frame 22 a driving shaft 23 is journalled, which is driven by the power take-off shaft of the tractor 19 energized by the universal shaft 18. An auxiliary frame 24 is connected at one end to the frame 22. The auxiliary frame 24 has at its other end two ears 17 arranged to define a horizontal centre line 25 and coaxially to a housing 16 of a bevel gear wheel drive 15. The input shaft 21 of this bevel gear wheel drive 15 is also coaxial to the centre line 25. The shaft 21 is driven through a belt transmission 26 from the driving shaft 23.

A housing 3 is rigidly secured to a foot 68 forming a support and associated with a leg 69, which is adapted to pivot with respect to the auxiliary frame 24 about the centre line 25 and being adjustable by means of a hydraulic cylinder 71 connected at one end to the frame 22 having a piston rod connected to and the leg 69, in order to adapt the mowing device 1 to the slope of the ground surface.

The mowing device 1 according to the invention comprises a housing 3, extending transversely of the intended direction of movement 2 and formed by a flat, elongated beam essentially consisting of a trough or channel 4 and a lid 5 secured thereto. On the housing 3 at least four and perhaps, six mowing members 7 are journalled so as to be rotatable about upright axes 8. The cutting members 7 are arranged near and above the housing 3 and are adapted to rotate pairwise in opposite directions. Each cutting member 7 is rigidly fastened by means of a shaft 9 to a driving gear 10 of a driving gear means 63 accommodated in the housing 3 and formed by a series of gears, that is to say, the said gear wheels 10 and coupling gears 11. The gear 10 nearest the tractor 19 is driven from the shaft 23 through coupling means formed by the belt transmission 26, the shaft 21, the bevel gear drive 15, a shaft 28 and an elastic coupling 27. The shaft 28 and the elastic coupling 27 are accommodated inside a drum 67 which is arranged on the cutting member 7 nearest the tractor 19.

Between each pair of gears 10 rotating towards one another in opposite senses are arranged an even number, for example, four coupling gears 11. From FIG. 4 it will be apparent that the shaft 9 of each cutting member 7 is rotatably journalled in an upright collar 31 of the lid 5 by means of bearings 30. Moreover, a seal 32 is provided between the cutting member 7 fastened to the shaft 9 by means of a transverse pin 33 and the collar 31.

Each cutting member 7 comprises a disc 36 secured by screws 34 to a hub 35 and having fastened to it one or more, for example, two cutters 37. The cutters 37 skim past and just beneath adjacent discs 36 without touching the same (see FIG. 1). The cutters 37 of adjacent cutting members 7 are relatively off-set through an angle of 90° so that they do not touch one another, although the paths of the cutters overlap one another. Each cutter 37 is freely rotatable about a pin 38 fastened to the disc 36. The right-hand side of FIG. 3 shows the cutter 37 turning through a circle 39 in FIG. 3 with respect to the disc 36 upon colliding with a stone without abutting against any part of the housing 3 on the disc 36.

FIG. 5 shows the arrangement of the coupling gear wheel 11 by means of a roller bearing 40 in the lid 5.

The cutters 37 are all of twisted shape so that they slightly lift the crop after cutting.

The mowing device 1 is of low structure and the shape of the cutting members 7 is such that the mowing device 1 can readily pass beneath the cut crop. The circumferential speed of the cutters 37 is very high, for example, 70 to 90 ms/sec with a circumferential diameter $e$ of 40 to 50 cms.

In operation the mowing device 1 is held by the links 20 in a forwardly inclined position so that the cutting members 7 are at an angle $f$ to the ground level.

The cutters 37 are located in upward embossed portions 59 of the discs 36 and during its revolution a cutter of an adjacent disc 36 passes by the other disc 36 each time in a further embossed portion 61.

The two cutting members 7 at the opposite ends of the implement each having a drum 67 fixed thereto. Moreover, the housing 3 has at each end on the rear side a stationary swath board 72. The mowing device 1 according to the invention can cut without any difficulty a first run 73 of a width $g$ from a field, the crop being then deposited in a swath 74 having a width $h$ so that wheel tracks for the next run are made free. When this first strip 73 is cut, no part secured to the housing 3 will reach into uncut crop.

The mowing device 1 of FIGS. 6 and 7 is identical to that of FIGS. 1 to 5, but the mowing device 1 of FIGS. 6 and 7 is arranged at the front of the tractor 19 or a pick-up vehicle, whilst the housing 3 is fastened at each end to a foot 68 of a leg 69. These legs 69 are suspended from an auxiliary frame 24 by means of parallel bars 76 and lifting cylinders 75. The angle $f$ between the mowing device 1 and the ground level is adjustable by turning the auxiliary frame 24 by means of a cylinder 77 with respect to the tractor 19. The shaft 21 of FIGS. 6 and 7 is driven by the universal shaft 18 of the tractor 19.

The mowing device 1 of FIG. 8 differs from that of FIG. 7 only in that the shaft 28 is journalled both at the top and at the bottom in a bearing housing 16 and the drum 67 operates as a coupling means between the shaft 28 and the cutting member 7 and is connected between them through two flexible couplings.

In the mowing device 1 of FIG. 9 the housing 3 is suspended from the vehicle 19 not only by means of the leg 69 and the foot 68 but also by means of a stationary shaft or tube 79, which is rigidly secured in the trough or channel 4 of the housing 3. The drive is performed around said shaft or tube 79. The housing 3 may be suspended on the left and right sides from the vehicle 19. The shaft or tube 79 is rigidly secured to the housing 16 in which not only the bevel gear wheel drive 15 but also a gear wheel drive 80 is arranged, which drives a tube 81 surrounding the shaft or tube 79. The tube 81 is journalled in bearings 82 and 83 of the housings 16 and 3 respectively and is rigidly secured to the drum 67, which in turn is rigidly secured to a cutting member 7.

Referring to FIG. 10 the support 68 is formed by a round shaft which is connected by a pivot 84 with an arm 85 of the suspension means for attachment to the vehicle 19. The rotary shaft 88 of the outermost cutting member 7 is further remote from the proximal end 87 of the housing 3 than the fastening area 86 of the support 68. Since the fastening area 86 is closely adjacent the end 87, the crop can be deposited in a swath of very large width $h$.

What we claim is:

1. In a mowing implement of the type including an elongate housing extending transversely of the direction of travel of the implement, a plurality of rotary members carried by said housing in closely overlying relation thereto, said cutting members having overlapping cutting paths whereby the implement is adapted to cut a swath of standing crop, and drive means within said housing interconnecting said cutting members for effecting simultaneous rotation thereof, the combination of:
   support means connected to said housing substantially wholly within the confines of a cut swath for supporting said housing from a powered vehicle;
   at least one end of said implement being provided with drive input means carried by said support means for rotatably driving one of said rotary cutting members, said drive input means including an upstanding shaft drivingly connected to and extending upwardly with respect to said one rotary cutting member; and
   an upstanding drum supported by and extending upwardly from said one rotary cutting member in surrounding relation to said upright shaft.

2. In a mowing implement as defined in claim 1 wherein said drive input means also includes a generally horizontal shaft disposed in elevated relation to said housing, and gear means for drivingly interconnecting said generally horizontal and upstanding shafts.

3. In a mowing implement as defined in claim 2 wherein said drive input means includes an elastic coupling joining the lower end of said upstanding shaft to said one rotary cutting member.

4. In a mowing implement as defined in claim 2 wherein said upstanding shaft is directly joined to said one rotary cutting member.

5. In a mowing implement as defined in claim 2 wherein said drum is fixed to said one rotary cutting member and said upstanding shaft is connected to said drum whereby the driving connection between said one rotary cutting member and said upstanding shaft is effected through the intermediary of said drum.

6. In a mowing implement as defined in claim 4 wherein said upstanding shaft is tubular and said support means includes a fixed shaft extending concentrically within said upstanding shaft and connected at its lower end to said housing.

7. In a mowing implement as defined in claim 1 wherein said drive input means includes a casing extending forwardly from said support means and receiving the upper end of said upstanding shaft, said drum extending between said one rotary cutting member and said casing.

8. In a mowing implement as defined in claim 7 wherein said support means includes a substantially horizontal foot attached to one end of said housing and an upwardly directed leg carrying said casing and extending downwardly into connection with said foot in rearwardly spaced relation to said housing.

9. In a mowing implement as defined in claim 8 wherein said drum is fixed coaxially to said one rotary cutting member.

10. In a mowing implement as defined in claim 9 wherein said drive input means also includes a generally horizontal shaft journalled in said casing and gear means within said casing for drivingly interconnecting said generally horizontal shaft to the upper end of said upstanding shaft.

11. A mowing implement comprising, in combination:
    an elongate housing extending transversely of the direction of movement of the implement and a train of meshing gears disposed within the length of said housing, a plurality of generally vertical shafts connected to certain of the gears and projecting upwardly through said housing, and a rotary cutting member fixed to each such shaft in closely overlying relation to said housing, said cutting members defining overlapping cutting paths along the length of the housing whereby to cut a swath in a standing crop which is substantially coextensive in width with the length of said housing;
    support means disposed behind said housing and extending forwardly into connection therewith for supporting the implement from a powered vehicle;
    at least one end of said implement being provided with drive input means connected to one of said rotary cutting members at one end of said housing for imparting drive to said one rotary cutting member, said drive input means comprising an upstanding shaft connected at its lower end to said one rotary cutting member and having an upper end spaced substantially above said one rotary cutting member, and forwardly projecting drive mechanism extending into driving connection with said upper end of the upstanding shaft; and
    an upstanding drum fixed coaxially to said one rotary cutting member in surrounding relation to said upstanding shaft and projecting upwardly from said one rotary cutting member into close proximity to said upper end of the upstanding shaft.

12. A mowing implement as defined in claim 11 wherein said support means comprises a generally horizontal arm fixed to said one end of the housing and extending rearwardly therefrom in closely spaced relation below said one rotary member.

13. A mowing implement as defined in claim 12 wherein the cut swath extends beyond both ends of said housing and said arm extends below said one rotary cutting member substantially beneath a fore and aft diameter thereof.

14. A mowing implement as defined in claim 12 wherein said one end of the housing terminates substantially at one side of the cut swath and said arm extends below said one rotary cutting member substantially beneath a fore and aft tangent to the path of said one rotary cutting member.

15. A mowing implement as defined in claim 11 wherein said support means comprises an auxiliary frame and at least one generally L-shaped support pivotally carried by said auxiliary frame, said support having a generally horizontal arm extending forwardly into fixed connection with said one end of the housing and an upstanding leg connected to said arm and extending upwardly into pivotal connection with said auxiliary frame.

16. A mowing implement as defined in claim 15 wherein said drive mechanism includes a forwardly projecting generally horizontal shaft coaxial with the pivotal connection between said leg and said auxiliary frame.

17. A mowing implement as defined in claim 15 including a second L-shaped support pivotally carried by said auxiliary frame and having a generally horizontal arm extending forwardly into fixed connection with the other end of said housing and an upstanding leg connected to such arm and extending upwardly into pivotal connection with said auxiliary frame.

* * * * *